(12) United States Patent
Ku

(10) Patent No.: US 8,026,671 B2
(45) Date of Patent: Sep. 27, 2011

(54) LED ASSEMBLY AND AN IMPROVED POWER SUPPLY CIRCUIT THEREOF

(75) Inventor: Chin-Long Ku, Taipei Hsien (TW)

(73) Assignee: Foxconn Technology Co., Ltd., Tu-Cheng, New Taipei (TW)

( * ) Notice: Subject to any disclaimer, the term of this patent is extended or adjusted under 35 U.S.C. 154(b) by 500 days.

(21) Appl. No.: 12/200,876

(22) Filed: Aug. 28, 2008

(65) Prior Publication Data
US 2009/0261742 A1 Oct. 22, 2009

(30) Foreign Application Priority Data
Apr. 18, 2008 (CN) ............. 2008 1 0066745

(51) Int. Cl.
*H05B 37/00* (2006.01)

(52) U.S. Cl. .......... 315/185 R; 362/249.02; 362/249.06; 362/249.14; 257/98

(58) Field of Classification Search .............. 315/185; 362/249.02, 249.06, 249.14; 257/48, 98–100
See application file for complete search history.

(56) References Cited

U.S. PATENT DOCUMENTS

| | | | | |
|---|---|---|---|---|
| 5,495,147 A * | 2/1996 | Lanzisera | ............... | 315/185 S |
| 5,534,718 A * | 7/1996 | Chang | ............... | 257/98 |
| 6,411,045 B1 * | 6/2002 | Nerone | ............... | 315/291 |
| 7,224,047 B2 * | 5/2007 | Carberry et al. | ............... | 257/676 |
| 2006/0044803 A1 * | 3/2006 | Edwards | ............... | 362/294 |
| 2006/0226795 A1 * | 10/2006 | Walter et al. | ............... | 315/312 |
| 2007/0117273 A1 * | 5/2007 | Elpedes et al. | ............... | 438/123 |
| 2007/0170448 A1 * | 7/2007 | Ito et al. | ............... | 257/98 |
| 2007/0170874 A1 * | 7/2007 | Kunimatsu et al. | ............... | 315/291 |

* cited by examiner

*Primary Examiner* — Douglas W Owens
*Assistant Examiner* — Amy Yang
(74) *Attorney, Agent, or Firm* — Altis Law Group, Inc.

(57) ABSTRACT

An LED device comprises an LED assembly and a power supply circuit. The power supply circuit includes an AC circuit connecting to the power source, a DC circuit coupling with the AC circuit, a driving circuit and a snubber circuit connected with each other and located between the DC circuit and the LED assembly. The locations of the driving circuit and the snubber circuit in the power supply circuit are exchangeable, i.e., the driving circuit being connected to the DC circuit and the snubber circuit being connected to the LED assembly, or the driving circuit being connected to the LED assembly and the snubber circuit being connected to the DC circuit. The snubber circuit is used for extending a time period for a voltage value of a DC initially applied to the LED assembly to increase from zero to a predetermined value.

18 Claims, 24 Drawing Sheets

LED ASSEMBLY AND AN IMPROVED POWER SUPPLY CIRCUIT THEREOF

BACKGROUND OF THE INVENTION

1. Field of the Invention

The present invention relates to a light emitting diode (LED) assembly and a power supply circuit thereof, and more particularly to an LED assembly having an improved power supply circuit which incorporates a snubber circuit therein for smoothing a varied degree of a voltage value of a DC initially input into the LED assembly.

2. Description of Related Art

LED have been available since the early 1960's. Because of the relatively high efficiency of LEDs, nowadays LED usage has been increased in popularity in a variety of applications, e.g., residential, traffic, commercial, industrial settings. The LEDs are often incorporated into a single lamp for achieving sufficient light output.

Conventionally, a power source is connected to the LED lamp to provide current for the LED lamp. Since the power source used for civil lighting purpose has a large voltage, i.e., 120V or 220V, which exceeds a maximum permitted voltage of the LEDs of the LED lamp, a power supply circuit is required to be connected between the power source and the LED lamp for reducing such a large voltage to a suitable voltage, to thereby protect the LEDs from damage by the large voltage. In addition, since the power source provided by the household outlets is alternating current (AC), a converter is needed which converts the alternating current into direct current (DC) first and then supplies the direct current to the LEDs. Thus, the power supply circuit should be devised to have a function of converting the alternating current into the direct current, as well as reducing the high voltage to a low voltage.

However, for such a power supply circuit, it cannot provide the DC with a smoothly gradually increased voltage value initially supplied to the LEDs. As soon as the LED lamp is turned on, the voltage value of the DC input into the LED lamp varies dramatically from zero to a predetermined value in a relatively short time. Such dramatically varied voltage value of the DC input into the LEDs of the LED lamp may cause damage to the LEDs and accordingly significantly reduce a life span of the LEDs. Even worse, the sharp rise of the voltage value of the inputted DC to the LEDs may destroy the LEDs unexpectedly.

What is needed, therefore, is an LED assembly and an improved power supply circuit thereof which can overcome the above-mentioned disadvantages.

SUMMARY OF THE INVENTION

An LED device comprises an LED assembly and a power supply circuit connecting the LED assembly to a power source. The power supply circuit includes an AC circuit connecting to the power source, a DC circuit coupling with the AC circuit, and a driving circuit and a snubber circuit connected with each other and located between the DC circuit and the LED assembly. The locations of the driving circuit and the snubber circuit within the power supply circuit are exchangeable according different requirements; for example, the driving circuit is connected to the DC circuit and the snubber circuit is connected to the LED assembly, or the driving circuit is connected to the LED assembly and the snubber circuit is connected to the DC circuit. Since the snubber circuit is incorporated in the power supply circuit, a varied gradient of a voltage value of the current initially supplied to the LED assembly can be flattened by the snubber circuit prior to the input of the current into the LED assembly, whereby LEDs of the LED assembly can be protected from being damaged.

Other advantages and novel features of the present invention will become more apparent from the following detailed description when taken in conjunction with the accompanying drawings.

BRIEF DESCRIPTION OF THE DRAWINGS

Many aspects of the present apparatus can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION OF THE INVENTION

Figure 1:
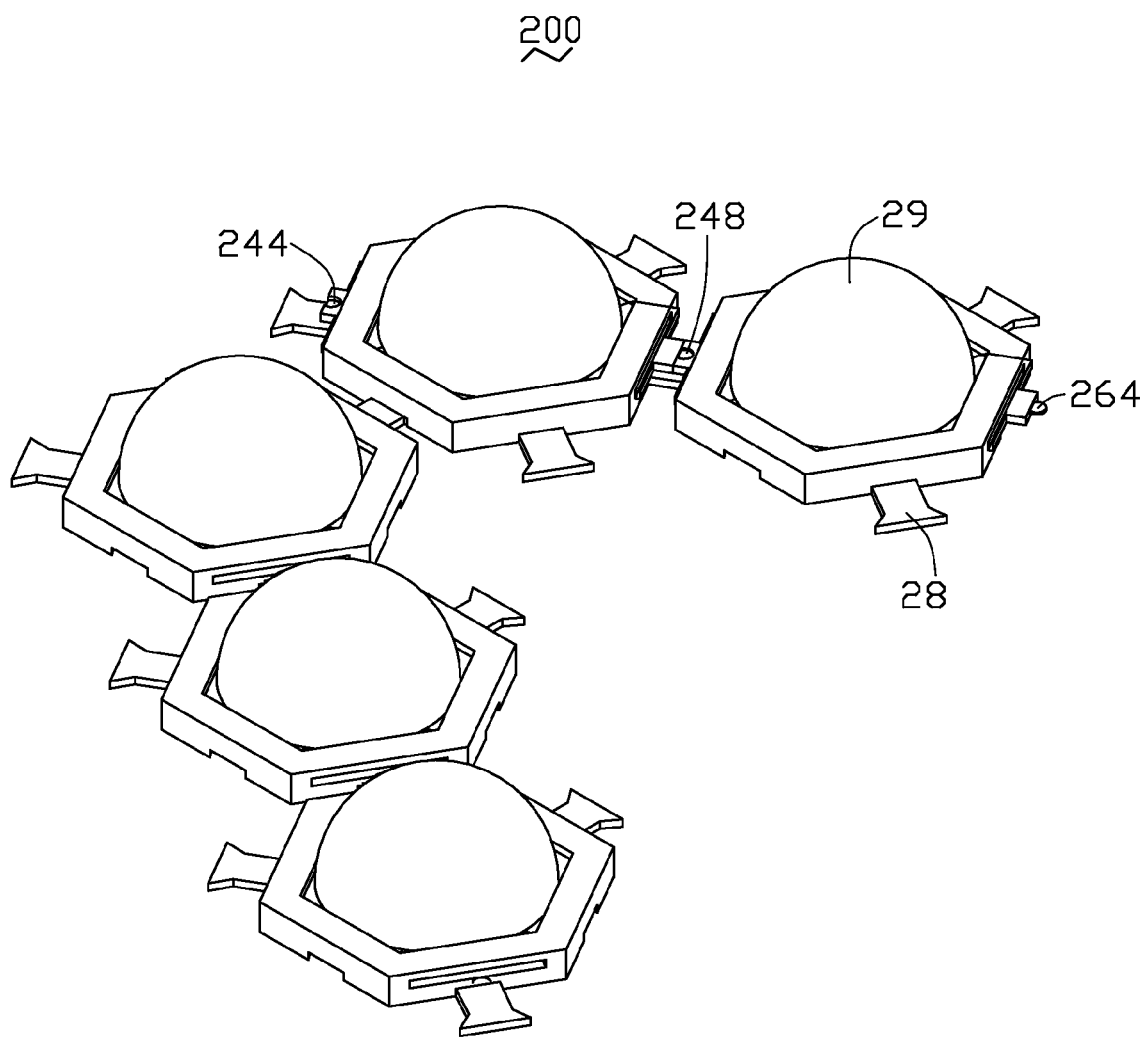
FIG. 1 is an assembled, isometric view of an LED unit of an LED assembly in accordance with a first embodiment of the present invention.
Figure 2:
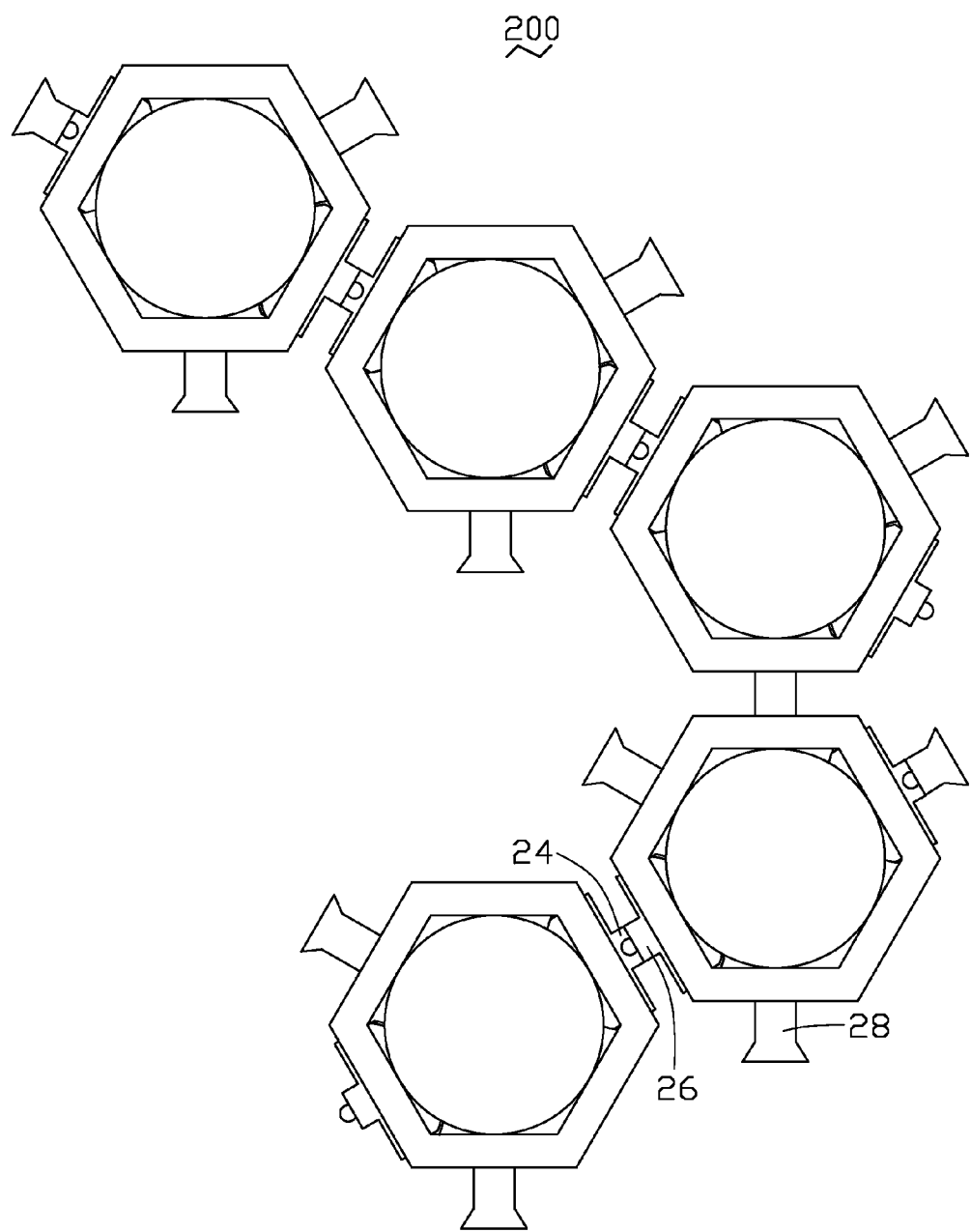
FIG. 2 is a top view of FIG. 1.
Figure 3:
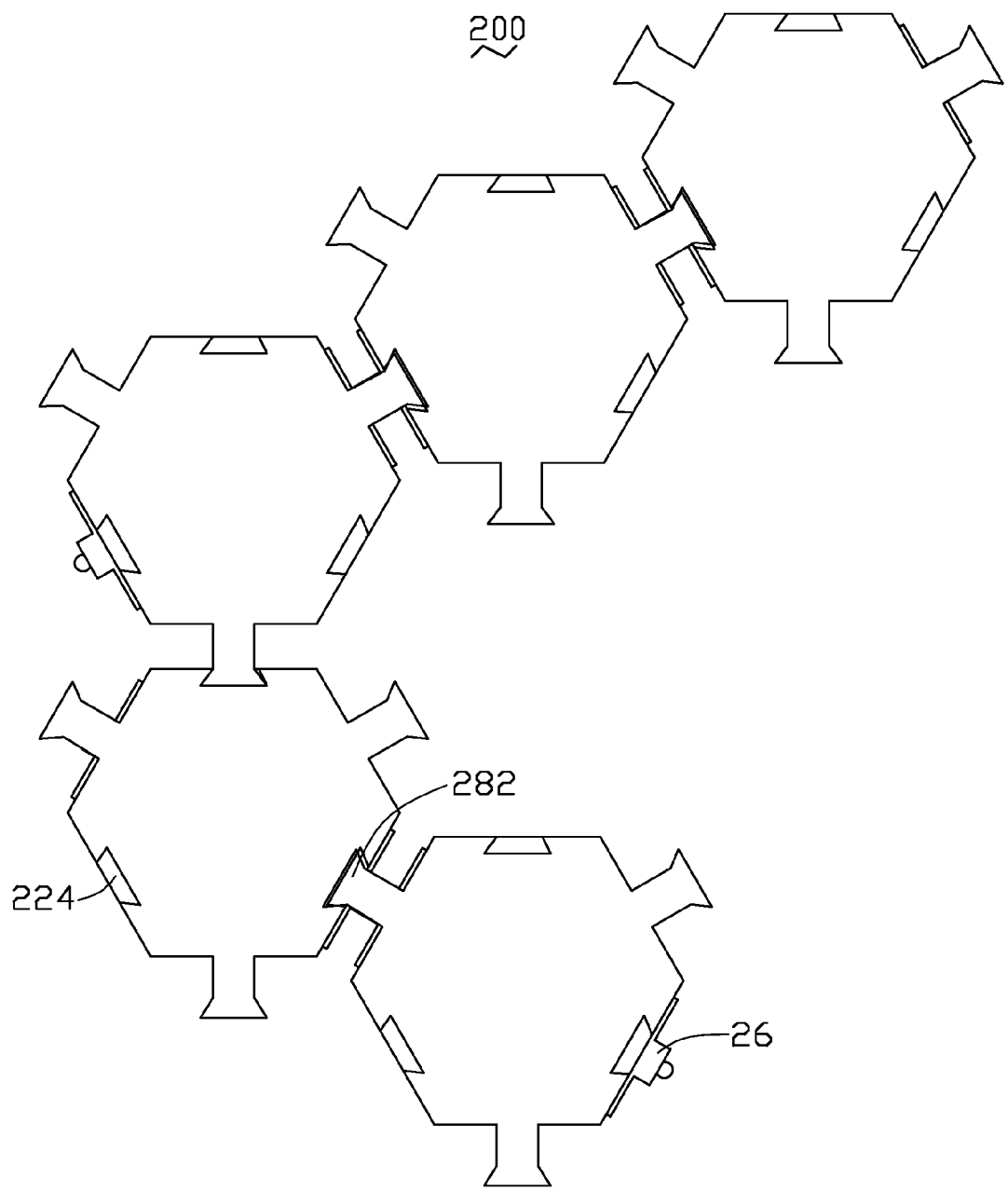
FIG. 3 is a bottom view of FIG. 1.
Figure 4:
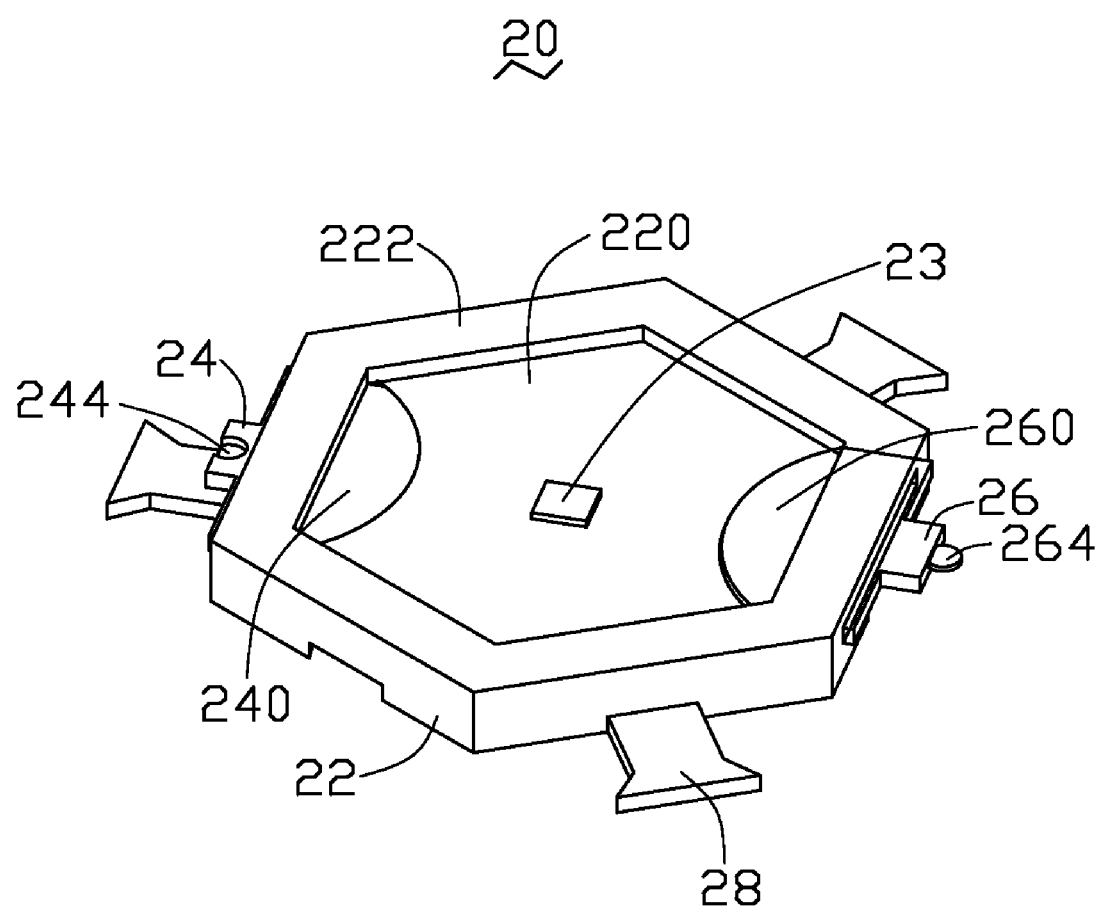
FIG. 4 is an enlarged, perspective view of an LED of the LED unit of FIG. 1, wherein an encapsulant of the LED is removed for clarity.
Figure 5:
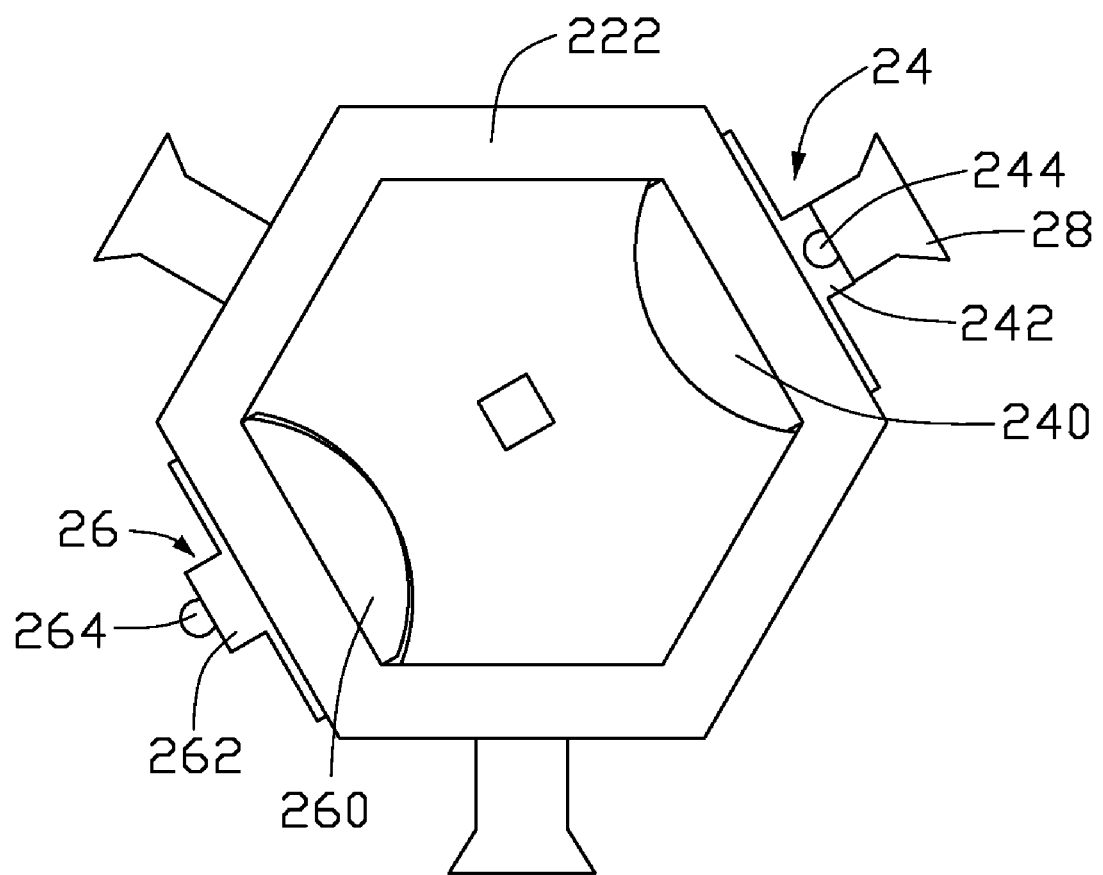
FIG. 5 is a top view of FIG. 4.
Figure 6:
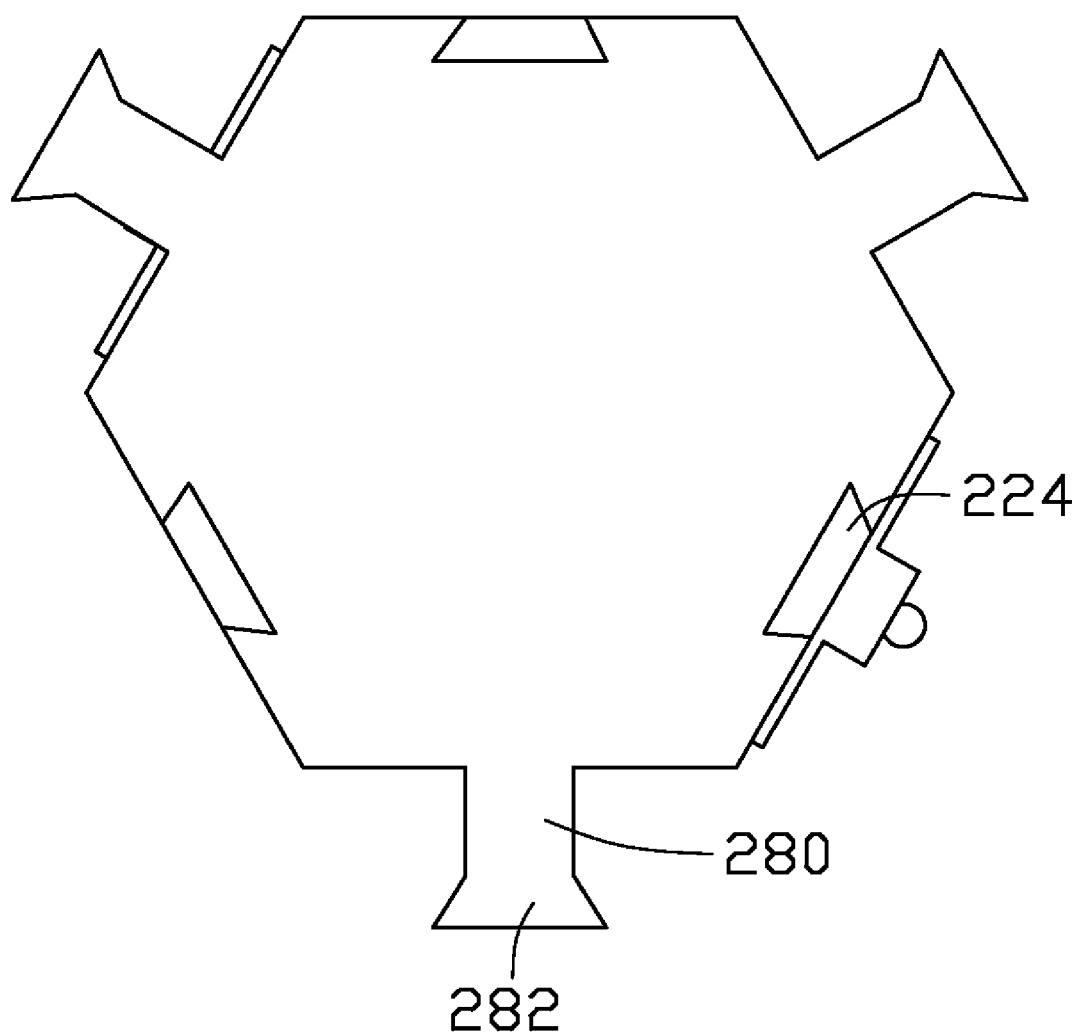
FIG. 6 is a bottom view of FIG. 4.
Figure 7:
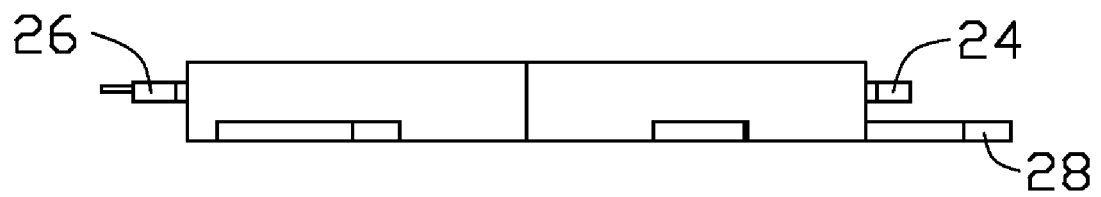
FIG. 7 is a side view of FIG. 4.
Figure 8:
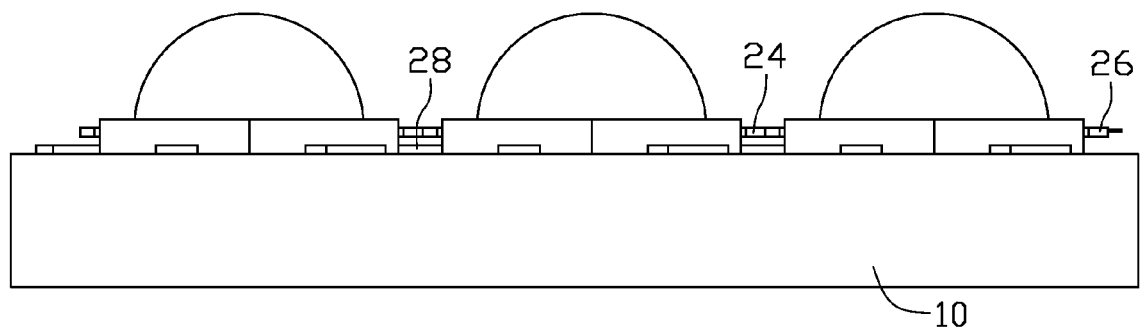
FIG. 8 is a side view of FIG. 1 with a substrate of the LED assembly placed below the LED unit.

Referring to FIGS. 1 and 8, an LED assembly in accordance with a first embodiment of the present invention comprises a substrate 10 and an LED unit 200 mounted on the substrate 10.

The substrate 10 is solid and entirely made of metal, such as copper, aluminum or an alloy thereof. The substrate 10 has a large and flat top surface for mounting the LED unit 200 thereon.

Also referring to FIGS. 4-7, the LED unit 200 is constructed by soldering a plurality of LEDs 20 together. Each LED 20 comprises a hexagonal base 22 defining a hexagonal cavity 220 therein, an LED die 23 adhesively attached in the cavity 220, a first electrode lead 24 and a second electrode lead 26 extending into the base 22 and electrically coupled to the LED die 23 via bonding wires (not shown), three legs 28 extending radially and outwardly from the base 22, and a hemispherical encapsulant 29 (see FIG. 1) encapsulating the LED die 23 therein. The base 22 is made of a material having a good heat conducting and electrically insulating capability, which is well known by those skilled in the related art, such as ceramic. The base 22 is in direct thermal contact with the top surface of the substrate 10 to direct heat generated by the LED die 23 to the substrate 10. The cavity 220 is defined in a central area of a top face of the base 22, being concentric with the base 22. A hexagonal ring-shaped step 222 is formed between the cavity 220 and a circumferential periphery of the base 22. The cavity 220 is used for receiving the LED die 23 therein, and retaining a bottom of the encapsulant 29 as well.

The first and second leads 24, 26 are substantially planar and parallel to the substrate 10; they are extended into the base 22 from two opposite sides of the base 22. Each of the first and second leads 24, 26 comprises a sheet 240, 260 penetrating through the step 222 to be located in the cavity 220, and a block 242, 262 (illustrated in FIG. 5) extending outwardly and horizontally from an extremity end of the sheet 240, 260 to be located outside of a corresponding side of the base 22. The first and second leads 24, 26 are located above the substrate 10 when the LED 20 is mounted on the substrate 10 (see FIG. 8). Each sheet 240, 260 consists of an arced inner part (not labeled) at the bottom of the cavity 220 for electrically connecting to the LED die 23 via the bonding wires, a middle part (not shown) fixedly received in the step 222 to secure the first and second leads 24, 26 in position, and a rectangular outer part (not labeled) extending beyond the step 222 to couple with the block 242, 262. An area of each sheet 240, 260 is far larger than that of each block 242, 262, to thereby enhance a reliability of the electrical connection of the first and second leads 24, 26 with the bonding wires. The block 242 of the first lead 24 forms an approximately circular groove 244 on a top face thereof, while the block 262 of the second lead 26 forms a nearly circular tab 264 projecting outwardly and horizontally from an extremity end thereof. As viewed from FIG. 1, the plurality of LEDs 20 are so electrically connected together that the grooves 244 of the first leads 24 of the LEDs 20 fittingly accommodate the tabs 264 of the second leads 26 of adjacent LEDs 20 therein. Since a current supplied to the LED die 23 travels through the first and second leads 24, 26 hovering above the substrate 10, wherein the substrate 10 is responsible for dissipating heat generated by the LED die 23 from the base 22, a current transferring pathway of the LED assembly is separated from a heat conducting pathway by a clearance between the substrate 10 and the first and second leads 24, 26; thus, an effect of the heat generated by the LED die 23 in influencing the current supplied to the LED die 23 can be reduced to an acceptable range.

A depth of the groove 244 of the first lead 24 is slightly larger than a thickness of the tab 264 of the second lead 26, whereby when the tab 264 is retained into the groove 244, a space 248 is formed between a top of the tab 244 and a lateral of the groove 264 (shown in FIG. 1). During soldering of the first and second leads 24, 26 together, the space 248 is capable of receiving excess solder (not shown) therein to prevent the excess solder from overflowing to the substrate 10.

The encapsulant 29 is partially retained into the cavity 220, and projects upwardly in a manner that a size of a cross-section thereof gradually decreases from bottom toward top. The encapsulant 29 envelops the LED die 23 and the inner parts of the sheets 240, 260 of the first and second leads 24, 26 therein, to protect the inner parts of the sheets 240, 260 and the LED die 23 from external influence, e.g., contamination and humidity. The encapsulant 29 is made of a transparent material, such as epoxy, glass, silicone or the like, to guide light emitted by the LED die 23 to radiate out of the LED 20. A fluorescent material (not shown) which is in particulate form, can be dotted in the encapsulant 29, to help the LED 20 to exhibit a certain colorful characteristic, when it is desired.

The three legs 28 are uniformly distributed around the circumferential periphery of the base 22 and located in vicinities of a bottom face of the base 22. The legs 28 are spaced from the first and second leads 24, 26 to avoid direct thermal contact therebetween. Each leg 28 is formed integrally with the base 22 and comprises a rectangular strip 280 and a trapezoidal locking portion 282 extending horizontally and outwardly from the strip 280 (see FIG. 6). Three cutouts 224 are equidistantly designed in the bottom face of the base 22 to alternate with the three legs 28, wherein each cutout 224 is trapezoidal in shape so as to receive the locking portion 282 of a corresponding leg 28 therein, thus engagingly securing adjacent LEDs 20 with each other.

In assembly, the LEDs 20 are fixed to each other to form the LED unit 200; the locking portion 282 of each leg 28 of each LED 20 is accommodated into a corresponding cutout 244 of an adjacent LED 20, and the tab 264 of the second lead 26 of each LED 20 is received in the groove 244 of the first lead 24 of the adjacent LED 20. Then the locking portions 282 of the legs 28 are soldered in the cutouts 224 of the bases 22, whereby the LED unit 200 is securely formed. The LED unit 200 is attached on the substrate 10 to cooperatively construct the LED assembly. At last, the first and second leads 24, 26 are soldered together to electrically connect the plurality of LEDs 20.

With the help of the space 248, during soldering of the first and second leads 24, 26, even if a quantity of the solder offered to the first and second leads 24, 26 exceeds a predetermined amount, the excess portion of the solder would not overflow to contaminate the LED assembly, particularly, the substrate 10. Thus, the top surface of the substrate 10 which supports the LEDs 20 thereon can be kept clean, and the problem caused by the overflowed solder such as a short circuit can be avoided.

In use, when the LED die 23 is activated to lighten, the heat generated by the LED die 23 is conducted to the substrate 10 via the base 22, while the current is conveyed to the LED die 23 through the first and second leads 24, 26. Since the first and second leads 24, 26 are separated from the substrate 10, the pathway through which the current is supplied is separated from the pathway through which the heat is dissipated, the heat would not significantly affect the set value of the current supplied to the LED die 23; thus, the current is capable of being maintained in a relatively steady level. The steadily input current insures the LED die 23 emitting light with a constant intensity; a good illumination of the LED assembly is thus obtained, and a lifetime of the LED assembly is accordingly prolonged.

Alternatively, during assembling, the process of soldering the first and second leads 24, 26 together can be implemented before the LED unit 200 attached on the substrate 10; thus, the LED unit 200 is substantially completed prior to the LED assembly. Since the LED unit 200 has the first and second leads 24, 26 connected with each other to realize electrical connections, and the legs 28 locked with the bases 22 to realize mechanical connections; thus, if the bases 22 of the LED unit 200 can provide sufficient heat dissipation to the LED dies 23, no substrate 10 is needed, and the LED unit 200 can be utilized individually. The LEDs 20 of the individual LED unit 200 can be freely arranged in various patterns according to different demands, without being restricted by a shape or a size of the substrate 10; therefore, a versatility of the LED unit 200 is obtained.

Furthermore, the relationship and the number of the first and second leads 24, 26 and the legs 28 can be changed in accordance with different requirements. For example, the first lead 24 can be located adjacent to the second lead 26, and one of the three legs 28 can be removed for reducing a manufacture cost.

Figure 9:
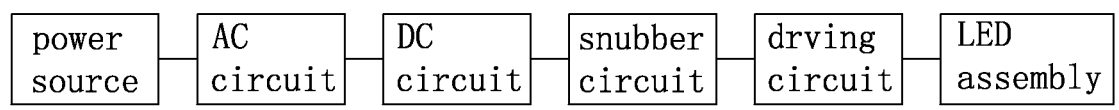
FIG. 9 is a schematic block view of a power supply circuit connected between a power source and the LED assembly, wherein a snubber circuit is connected between a DC circuit and a driving circuit of the power supply circuit.
Figure 10:
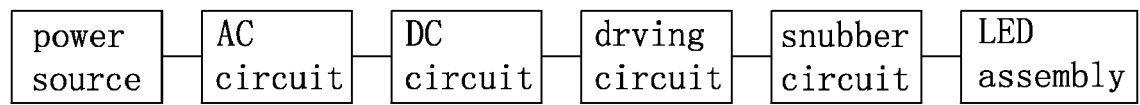
FIG. 10 is a view similar to FIG. 9, but the snubber circuit is positioned between the driving circuit and the LED assembly.

As illustrated in FIG. 9, the LED assembly can be connected to a snubber circuit to protect the LED die 23 from being damaged at the time when initially, electrically connecting the LED assembly to a power source. Conventionally, the LED assembly is sequentially connected to a driving circuit, a direct current (hereinafter DC) circuit, an alternating current (hereinafter AC) circuit, and a power source. The driving circuit, DC circuit and AC circuit are cooperatively called a power supply circuit. The AC circuit inputs an AC into DC circuit from the power source; the DC circuit converts the AC to a DC, which is then conveyed to the LED assembly via the driving circuit. However, such power supply circuit can only control a current type and a voltage value of the current input into the LEDs, and cannot control a variation of a voltage value of the DC initially input into the LEDs. Following an electrical connection between the power supply circuit and the power source, the voltage value of the DC into the LED assembly varies dramatically from zero to a large value in a relatively short time; that is to say, a varied gradient (curve) of the voltage value of the DC supplied to the LED assembly relative to time is approximately vertical. The dramatically varied voltage value of the DC input into the LED die 23 from the circuit supply circuit during the initial connection between the power supply circuit and the power source would damage the LED die 23. Therefore, in FIG. 9 of the present invention, the snubber circuit is added between the DC circuit and the driving circuit. The snubber circuit smoothens the conventional DC with the sharply varied voltage value into a DC with a smoothly gradually increased voltage value, which is input into the LED assembly and would not damage the LED die 23. In operation, as soon as the LED assembly is electrically connected with the power source, an AC is conveyed to the DC circuit via the AC circuit. The DC circuit converts the AC into a DC, which is input into the snubber circuit. After passing through the snubber circuit, the conventional sharp variation of the voltage value of the DC is relieved, and the voltage value of the DC becomes smoothly gradually increased; in other words, a curve of the voltage value of the DC from the snubber circuit relative to time becomes more horizontally oriented and smooth, as compared with the more vertical orientation of the voltage value obtained from the conventional power supply circuit which does not have the snubber circuit. The DC, which is modulated by the snubber circuit to have a more flat curve, is then input into the LED assembly via the driving circuit, which enables the LED die 23 to lighten from dark to bright in a slower manner. Therefore, the damage caused by the sharply increased voltage value of the DC initially applied to the LED die 23 is prevented. Also, it can be apprehended by those skilled in the related art that such snubber circuit can be connected between the driving circuit and the LED assembly as well, which is shown in FIG. 10.

Figure 11:
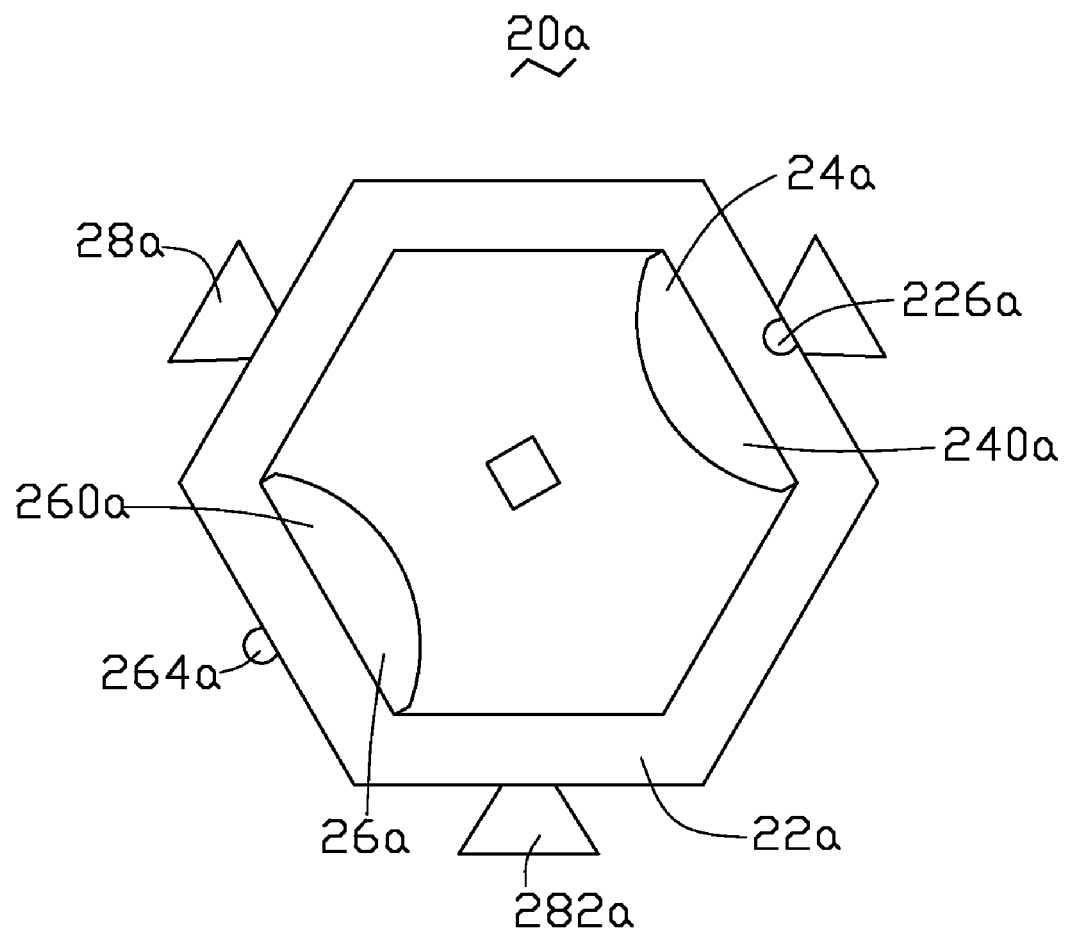
FIG. 11 is a view similar to FIG. 5, showing an LED in accordance with a second embodiment of the present invention, wherein a first lead, a second lead and legs of the LED are shorter than those of the LED of FIG. 5.

A distance between two adjacent LEDs 20 is associated with a length of the strip 280 of the leg 28 and a sum of lengths of respective portions of the first lead 24 and the second lead 26 extending outside the base 22. In order to obtain much more light per area, the LEDs 20 should abut against each other more intimately without the distance existing therebetween, or only a little distance therebetween. FIG. 11 schematically shows a second embodiment of the present invention, in which the configurations of the first and second leads 24*a*, 26*a* and the legs 28*a* are changed so as to hold adjacent LEDs 20*a* in intimate contact with each other. The first lead 24*a* of the LED 20*a* comprises a sheet 240*a* entirely received in a base 22*a*. The second lead 26*a* comprises a sheet 260*a* accommodated within the base 22*a*, and a tab 264*a* extending outwardly beyond the base 22*a*. For realizing a connection between the first lead 24*a* and the second lead 26*a* of two adjacent LEDs 20*a*, a portion of the base 22*a* is recessed to form a trough 226*a*, in which an outmost part of the sheet 240*a* of the first lead 24*a* is exposed. Accordingly, each leg 28*a* only remains a locking portion 282*a* to be snugly fitted into a corresponding cutout (not shown) in an adjacent base 22*a*. Since the tab 264*a* of the second lead 26*a* of each LED 20*a* is fully received in the trough 226*a* of the base 22*a* of an adjacent LED 20*a* to electrically connect with the first lead 24*a* of the adjacent LED 20*a*, and the leg 28*a* completely received in the corresponding cutout of the base 22 of the adjacent LED 20*a*, lateral sides of the two adjacent LEDs 20*a* are capable of abutting against each other intimately. Thus, the LEDs 20*a* can be arranged in a higher density, and an overall output intensity of the light is accordingly increased. On the other hand, supposed that the light produced per area can meet a lighting intensity requirement, the first and second leads 24, 26 and the legs 28 of the LEDs 20 of the first embodiment only need to be shorten, to avoid redesigning and remanufacturing of the base 22.

Figure 12:
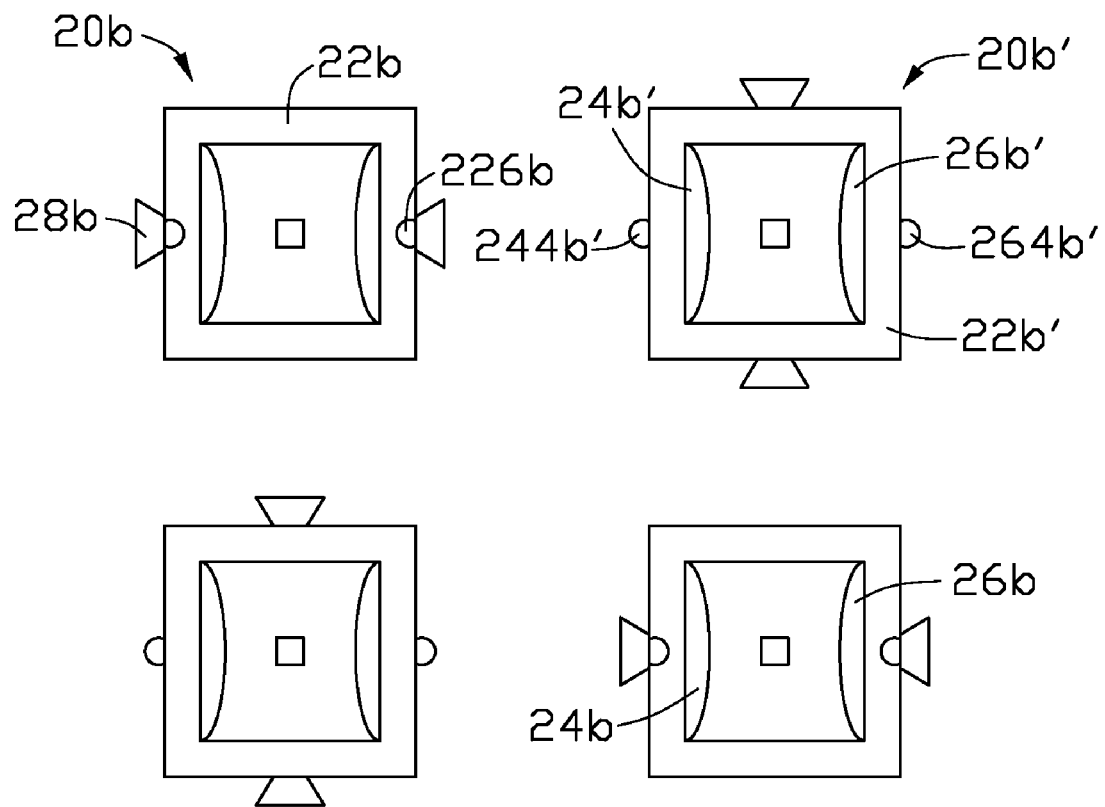
FIG. 12 is a top view of an LED unit in accordance with a third embodiment of the present invention.
Figure 13:
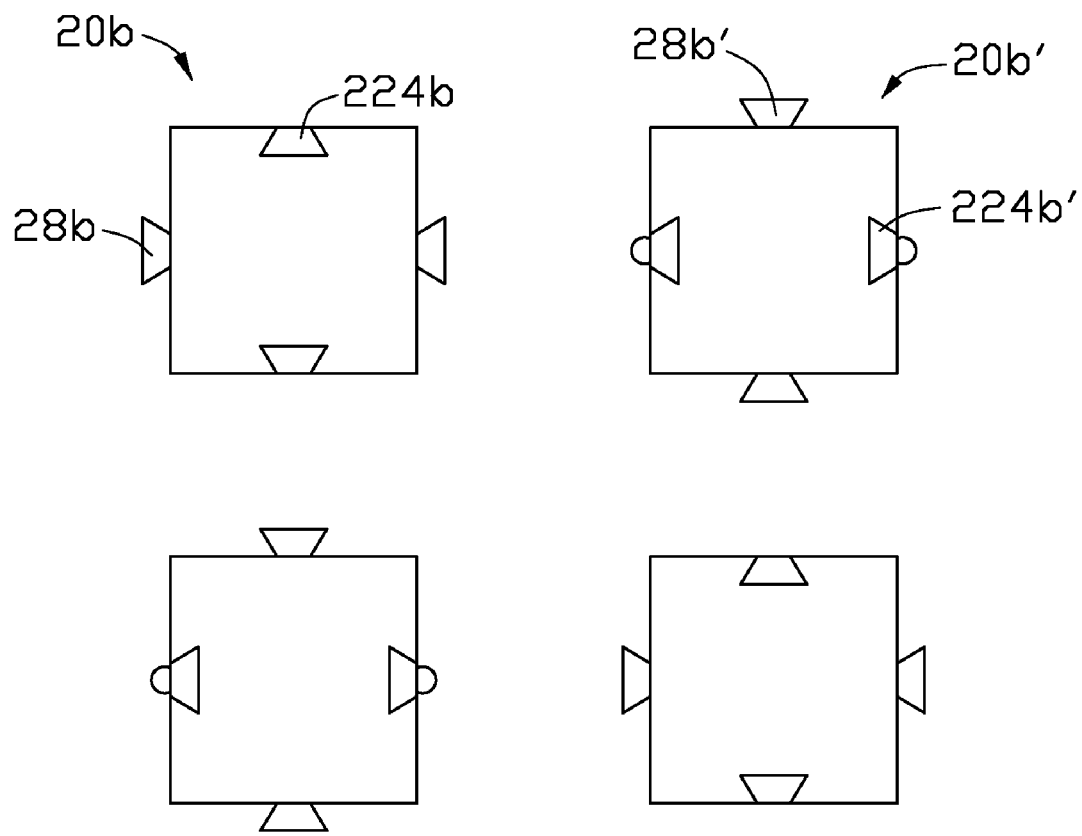
FIG. 13 is a bottom view of FIG. 12.
Figure 14:
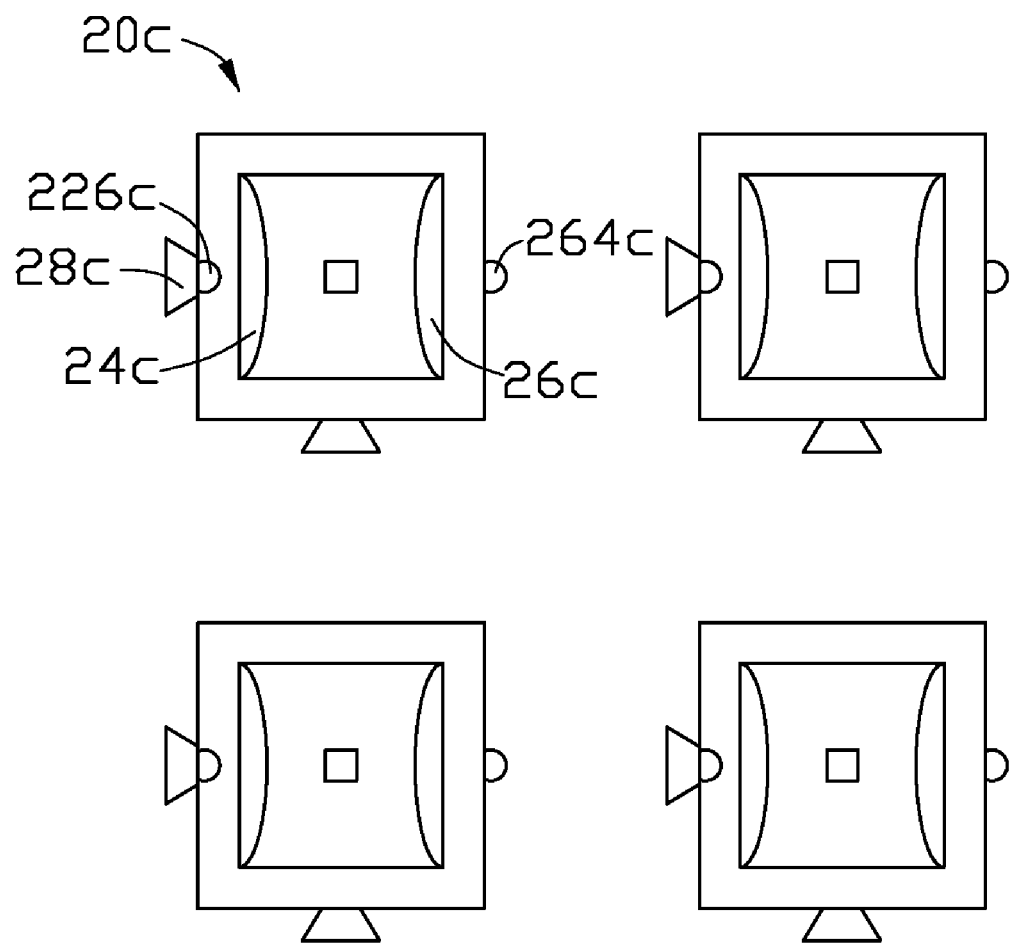
FIG. 14 is a top view of an LED unit in accordance with a forth embodiment of the present invention.
Figure 15:
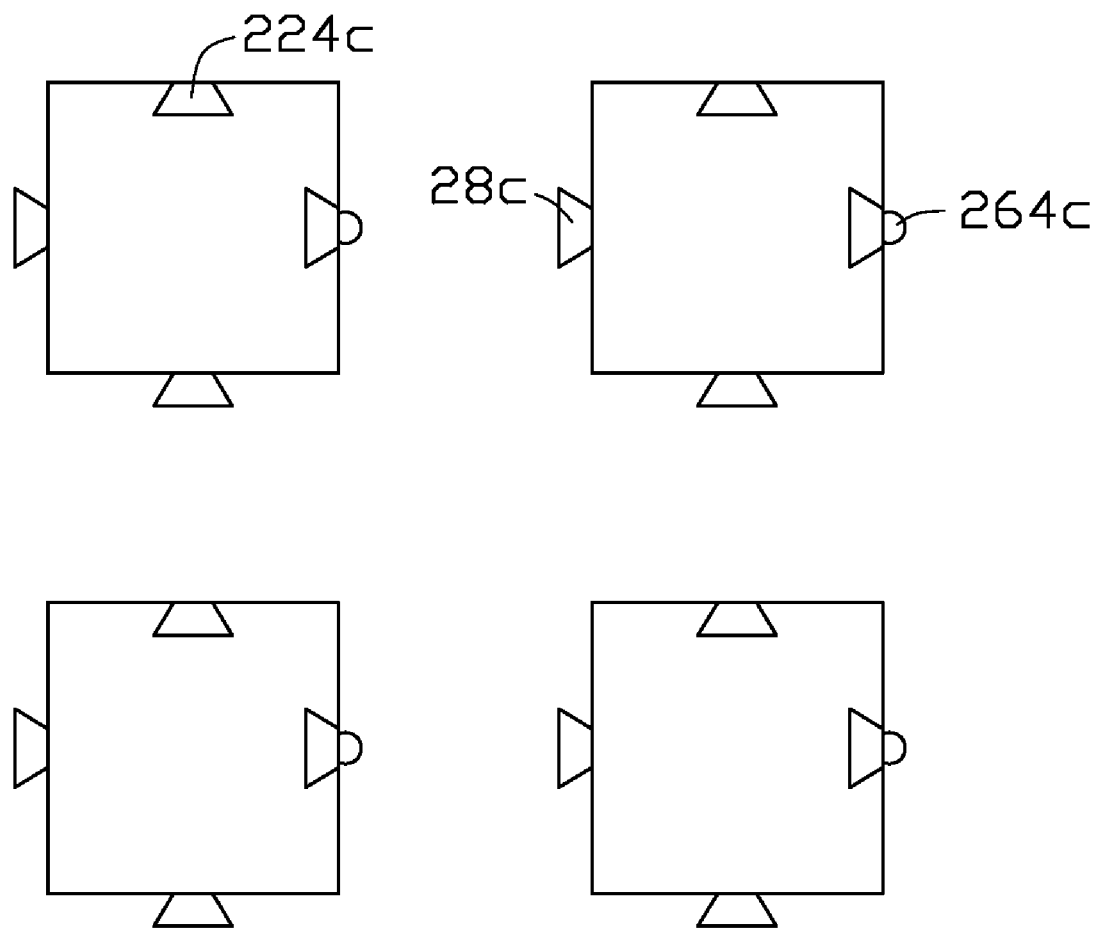
FIG. 15 is a bottom view of FIG. 14.

Note that a shape and a size of the base 20 of the first embodiment can be changed to various types according to different occasions. For example, FIGS. 12-13 illustrate a third embodiment of the present invention, in which the base 22*b*, 22*b'* is in the form of a square, and has two legs 28*b*, 28*b'* formed from two opposite sides thereof and two cutouts 224*b*, 224*b'* defined at other two opposite sides thereof. In this embodiment there are two types of LEDs 20*b*, 20*b'*: the first type LEDs 20*b* each have two troughs 226*b* defined at the two opposite sides of the base 22*b* to expose outermost parts of a first and second leads 24*b*, 26*b*; the second type LEDs 20*b'* each have two opposite tabs 244*b'*, 246*b'* projecting outwardly from the first and second leads 24*b'*, 26*b'* beyond the other two opposite sides of the base 22*b'*. The tabs 244*b'*, 264*b'* of the second type LED 20*b'* are received in the troughs 226*b* of an adjacent first type LED 20*b* and contact the first and second leads 24*b*, 26*b* of the first type LED 20*b*, to thereby electrically connect the first type and second type LEDs 20*b*, 20*b'* together. The first type LEDs 20*b* and the second type LEDs 20*b'* are so locked together that the legs 28*b* of each first type LED 20*b* are retained into the cutouts 224*b'* of two adjacent second type LEDs 20*b'*, and the cutouts 224*b* of each first type LED 20*b* receive the legs 28*b'* of other two adjacent second type LEDs 20b' therein. Such mutual connections of the plurality of LEDs 20b, 20b' can also be characterized in that: the legs 28b of the first type LEDs 20b realize transverse connections, and the legs 28b' of the second type LEDs 20b' realize longitudinal connections. Furthermore, the LEDs 20b, 20b' with square bases 22b, 22b' can also be modified to have different configurations, which are illustrated in FIGS. 14-15 of the forth embodiment of the present invention, for facilitating a uniform design and manufacture of the LEDs 20b, 20b'. As shown in FIGS. 14-15, each LED 20c of the forth embodiment has two legs 28c formed from two adjacent sides of the base 22c, and two cutouts 224c defined at other two adjacent sides of the base 22c. Each LED 20c further forms a tab 264c of a second lead 26c extending outwardly beyond a side of the base 20c, and a trough 226c defined at an opposite side of the base 22c to expose an outmost part of a first lead 24c. The trough 226c receives the tab 264c of an adjacent LED 20c. In assembly, the LEDs 20c mechanically engage with each other by fitting the legs 28c of each LED 20c into corresponding cutouts 224c of two adjacent LEDs 20c, and electrically couple with each other by soldering the tab 264c of each LED 20c in the trough 226c of an adjacent LED 20c. Due to the legs 28c of each LED 20c, both transverse and longitudinal connections of the LEDs 20c can be realized, meanwhile the LEDs 20c have the same configuration and structure.

Figure 16:
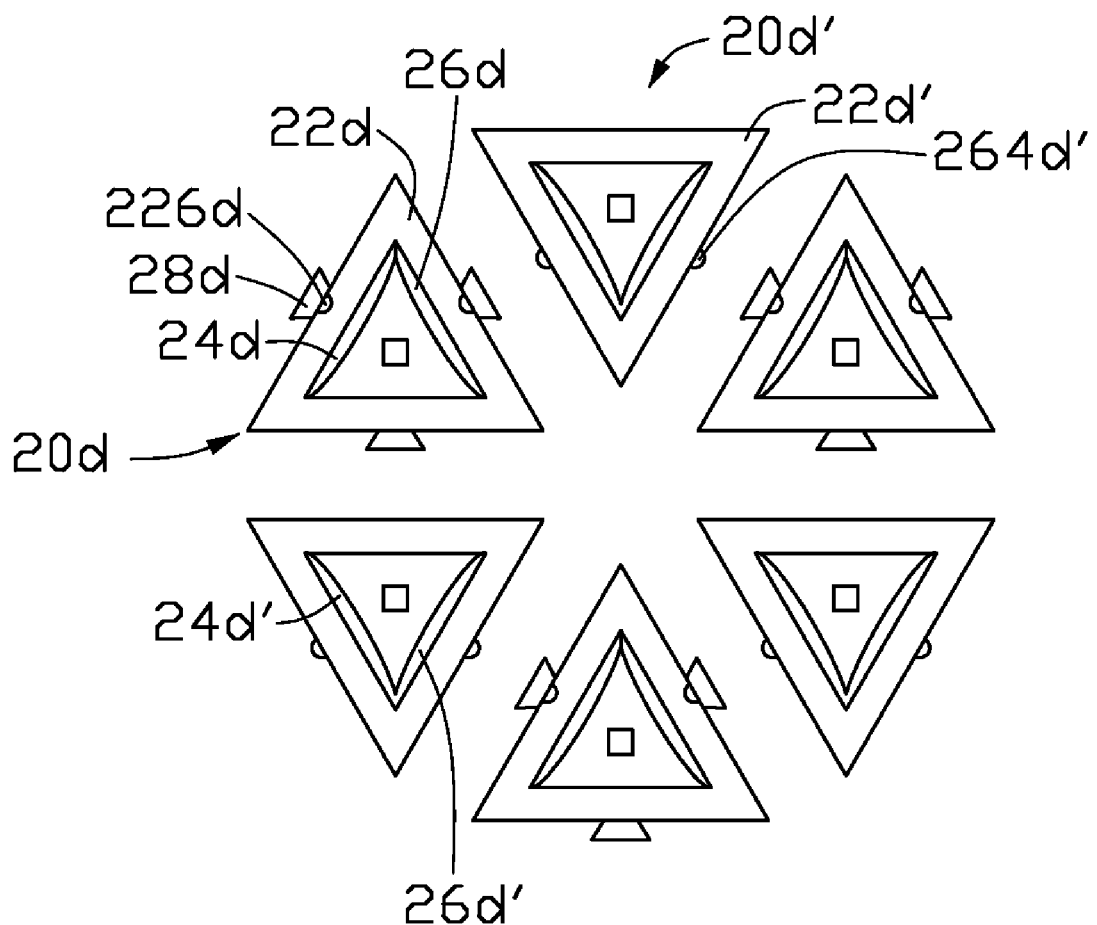
FIG. 16 is a top view of an LED unit in accordance with a fifth embodiment of the present invention.
Figure 17:
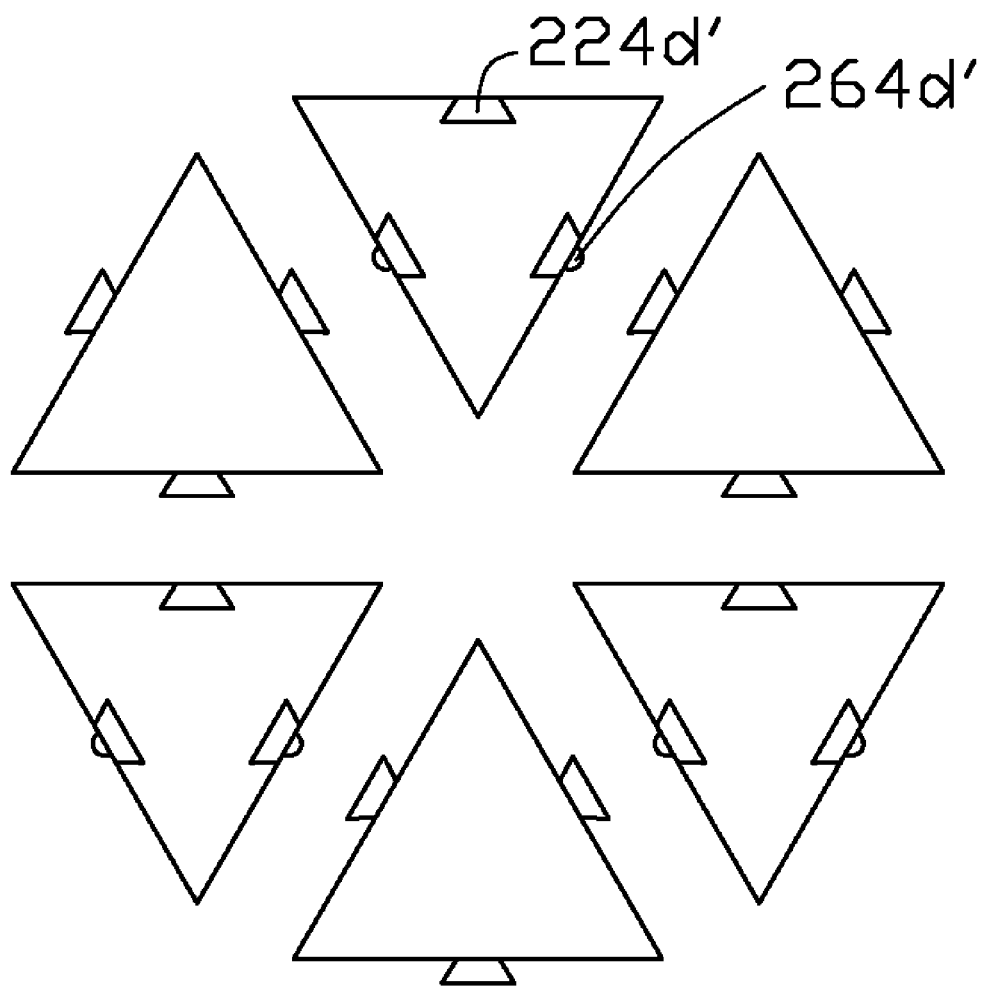
FIG. 17 is a bottom view of FIG. 16.
Figure 18:
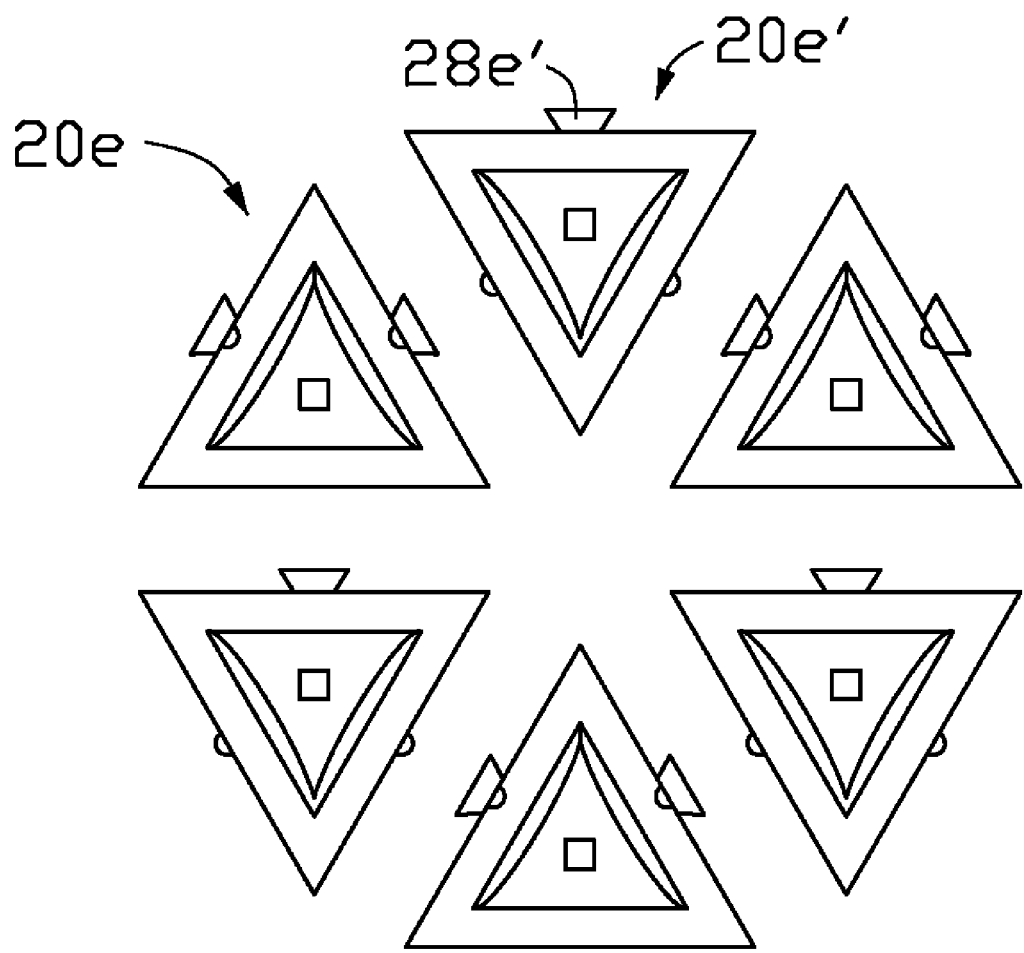
FIG. 18 is a top view of an LED unit in accordance with a sixth embodiment of the present invention.
Figure 19:
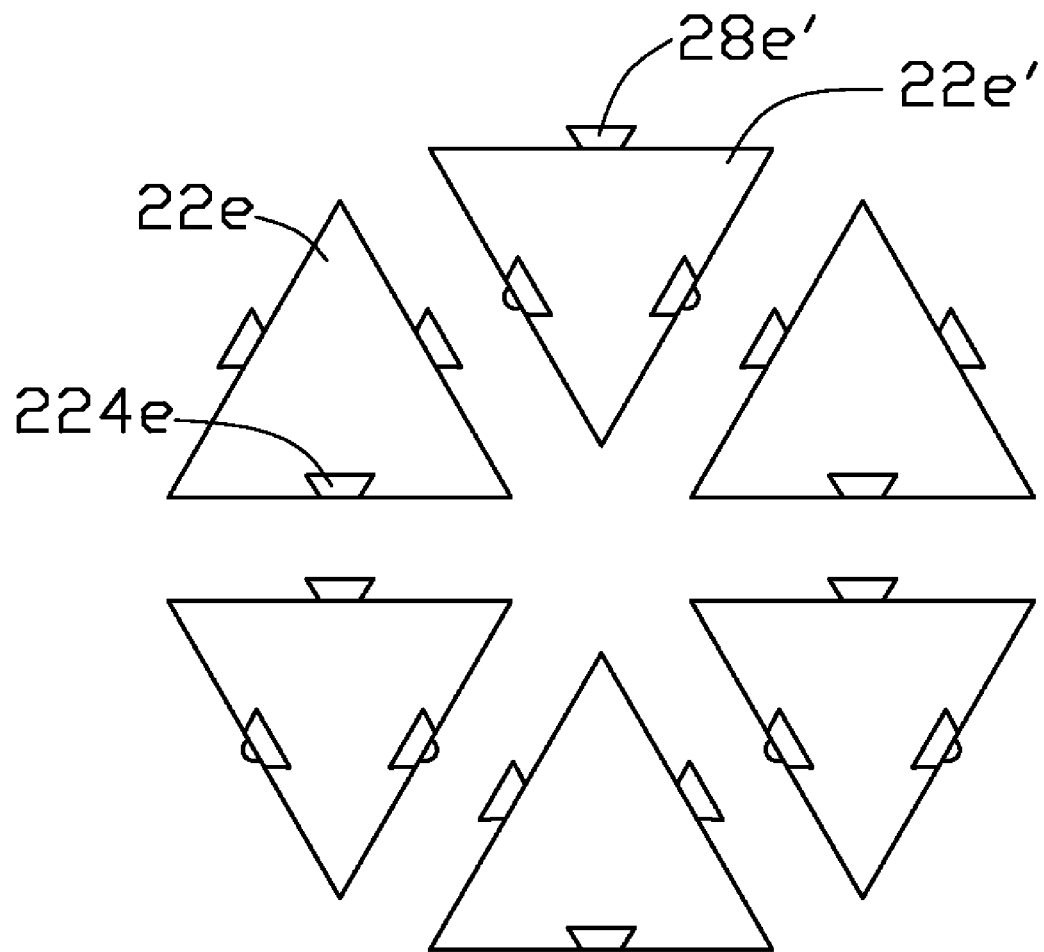
FIG. 19 is a bottom view of FIG. 18.

FIGS. 16-17 show a fifth embodiment of the present invention, in which the base 22d, 22d' is shaped to be triangle. Considering electrical and mechanical connections between the plurality of LEDs 20d, 20d', the LEDs 20d, 20d' should be designed to have two different configurations: a first type LEDs 20d each form three legs 28d respectively extending outwardly from three sides of the base 22d, and define two troughs 226d at two sides of the base 22d to expose outmost parts of a first lead 24d and a second lead 26d thereof; a second type LEDs 20d' each define three cutouts 224d' around a periphery of the base 22d' corresponding to the three legs 28d, and have two tabs 264d' extending outwardly from first and second leads 24d', 26d' beyond two sides of the base 22d'. In assembly, the three legs 28d of each first type LED 20d are respectively engaged in corresponding three cutouts 224d' of three adjacent second type LEDs 20d', and the two troughs 226d respectively accommodate two corresponding tabs 264d' of two adjacent second type LEDs 20d' therein. In this embodiment, the first type LED 20d acts as an active mechanical connector, and the second type LED 20d' is employed as a passive mechanical connector. Alternatively, one leg 28d of the first type LED 20d can be moved to the second type LED 20d', whereby each of the first type LED 20d and the second type LED 20d' acts as the active mechanical connector. Such variations of the legs 28d, 28d' between the first type LED 20d and the second type LED 20d' are shown in FIGS. 18-19 in accordance with a sixth embodiment of the present invention. A first type LED 20e forms a cutout 224e in a bottom of a base 22e at a location where the original leg 28d of the fifth embodiment is formed. Accordingly, a second type LED 20e' forms a leg 28e' at a location where the original cutout 224d' of the fifth embodiment is defined.

Figure 20:
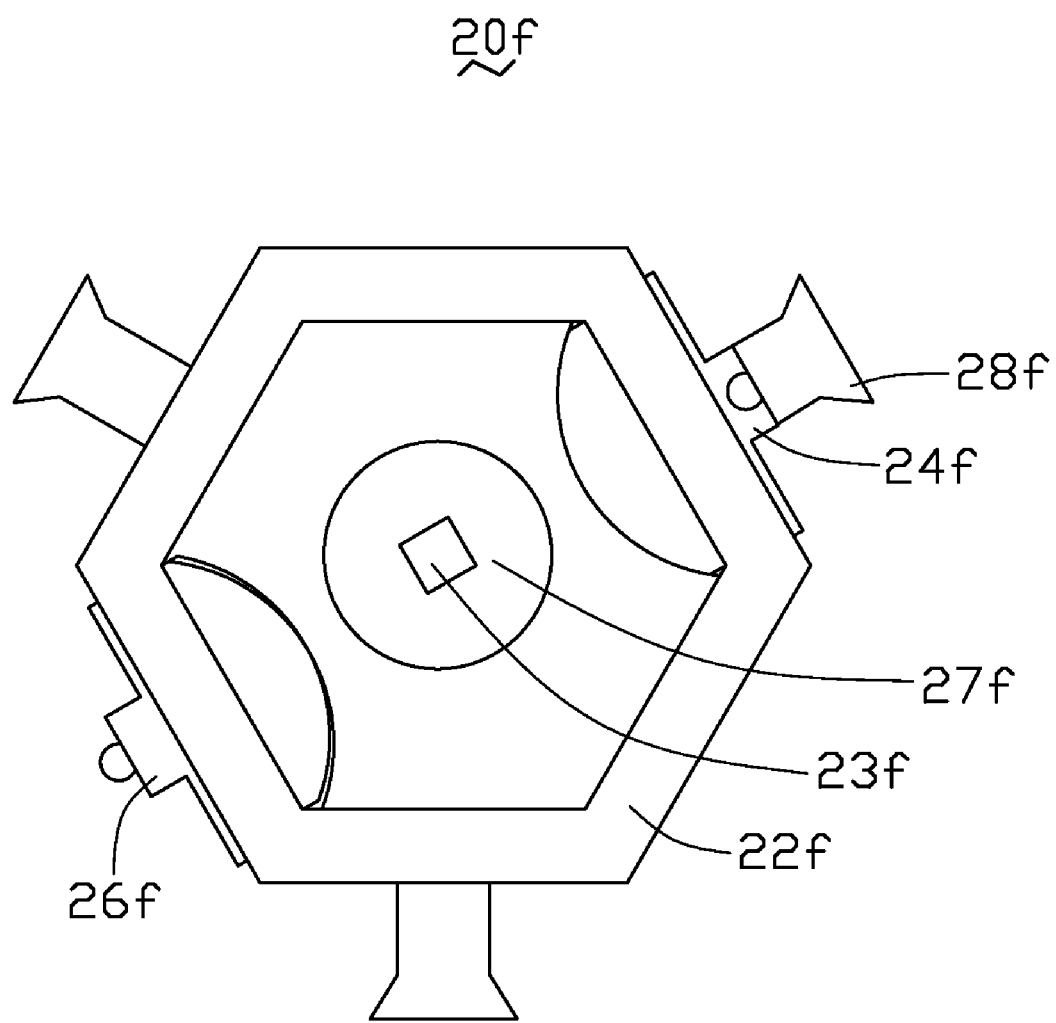
FIG. 20 is a top view of an LED in accordance with a seventh embodiment of the present invention.
Figure 21:
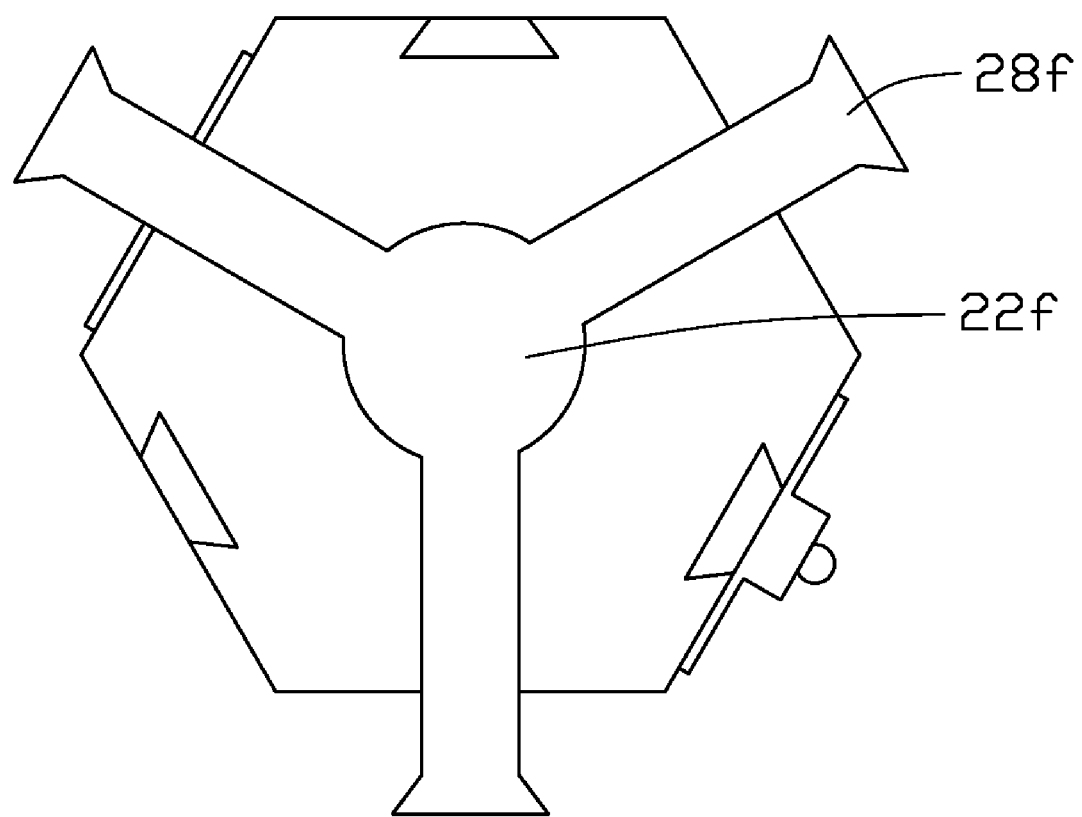
FIG. 21 is a bottom view of FIG. 20.

Furthermore, the base 22 of the first embodiment can be modified to another structure which is shown in FIGS. 20-21 in accordance with a seventh embodiment of the present invention. The differences of the seventh embodiment relative to the first embodiment are given below.

The base 22f of the LED 20f of the seventh embodiment is made of a thermally isolating and electrically insulating material such as epoxy, plastic and so on. A through hole (not labeled) is defined in a center of the base 22f of the LED 20f. Three channels (not labeled) are radially formed in a bottom of the base 22f, communicating with the through hole. A metal structure (not labeled), which is integrally formed by a post 27f and three legs 28f, is filled in the through hole and the three channels, and separated from the first lead 24f and the second lead 26f by the base 22f. Each leg 28f has an interior portion (not labeled) retained in a corresponding channel and coupling with a circumferential periphery of the post 27f, and an exterior portion (not labeled) extending outside the base 22f for locking with an adjacent LED 20f. The post 27f, the legs 28f and the base 22f contact the substrate 10 by bottoms thereof engaging with the top surface of the substrate 10. An LED die 23f is fixed on a top of the post 27f via a thermally conducting grease or glue. By using this construction, nearly all of heat generated by the LED die 23f is conducted to the substrate 10 via the post 27f and the legs 28f, while a current given to the LED die 23f is conveyed through a first and second leads 24f, 26f which are spaced from the post 27f and the legs 28f by the base 22f; thus, a current conducting pathway of the LED assembly and a heat conducting pathway thereof are substantially separated from each other, and the current can be maintained in a steady state without being affected by the heat. Note that all of other components in this embodiment are the same as those described in the first embodiment.

Figure 22:
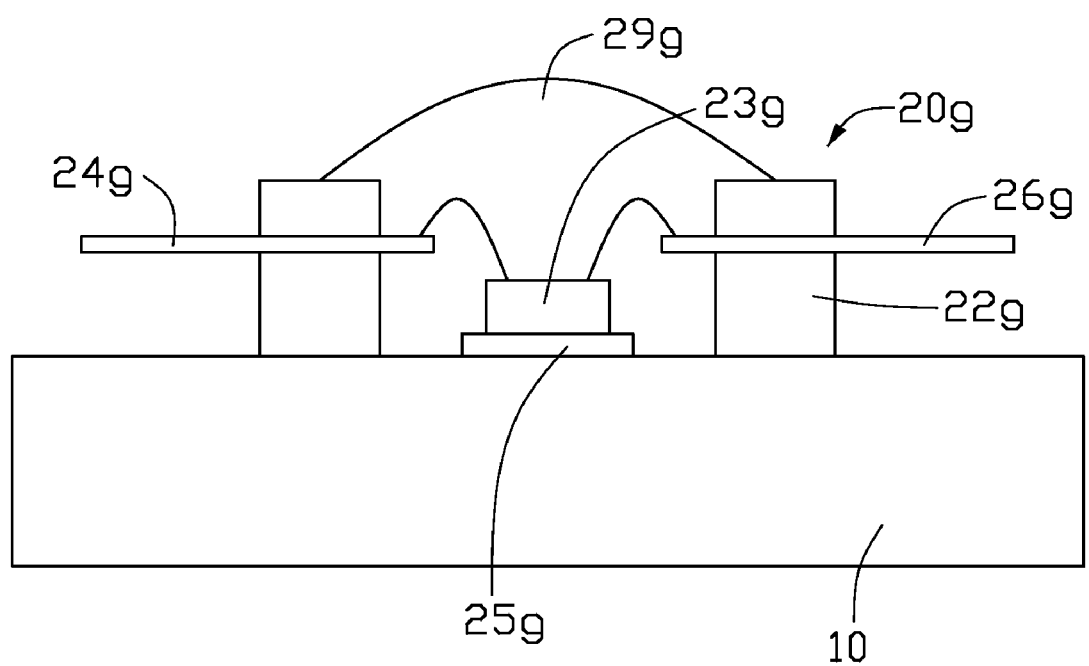
FIG. 22 is a cross-sectional view of an LED assembly in accordance with an eighth embodiment of the present invention.
Figure 23:
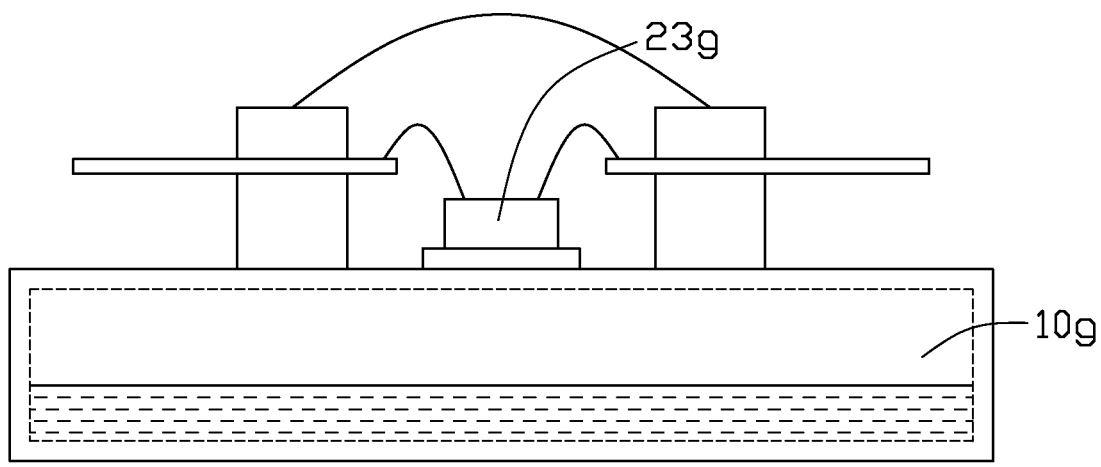
FIG. 23 is a view similar to FIG. 22, wherein a substrate of the LED assembly contains a coolant therein.

Referring to FIG. 22, which shows an LED assembly in accordance with an eighth embodiment of the present invention. In order to conduct heat generated by an LED die 23g to the substrate 10 more rapidly, a portion of a base 22g placed between the LED die 23g and the substrate 10 is omitted, while the LED die 23 is directly bonded on the top face of the substrate 10 via a kind of heat conducting adhesive 25g. Preferably, a thickness of the heat conducting adhesive 25g is selected to be less than 0.01 inches, for obtaining a balance between a good heat conducting capability and a sufficient gluing force. The base 22g of each LED 20g is annular to spacedly surround the LED die 23g. A first lead 24g and a second lead 26g are respectively inserted into the base 22g with inner parts (not labeled) thereof being exposed and outer parts (not labeled) thereof hovering above the substrate 10. The LED die 23g is electrically connected to the first and second leads 24g, 26g via golden wires (not labeled). An encapsulant 29g envelops the LED die 23g and the inner parts of the first and second leads 24g, 26g therein to protect the LED die 23g from contamination and damage. Referring to FIG. 23, for more efficiently deriving heat from the LED die 23g, such solid metal substrate 10 can be replaced by a hollow substrate 10g which transfers heat by using a phase change of working fluid. The substrate 10g can be a flat vapor chamber or a heat pipe. The substrate 10g can further connect with a heat sink (not shown) to disperse heat absorbed thereby to atmosphere, whereby the heat can be dissipated timely and sufficiently because of a large heat dissipating area of the heat sink.

Figure 24:
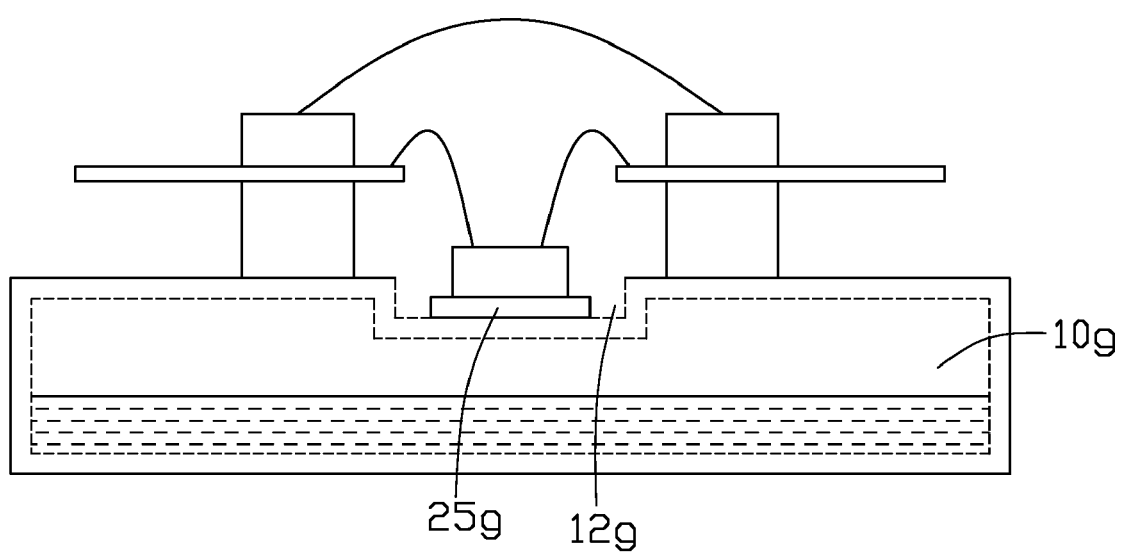
FIG. 24 is a view similar to FIG. 23 with a part of the substrate stamped to form a concave.

As viewed from FIG. 24, furthermore, the substrate 10g can be stamped to form a plurality of concaves 12g (only one shown) at spots where the LED dies 23g are mounted, whereby the LED dies 23g can be accurately positioned at predetermined locations of the substrate 10g. On the other hand, such concave 12g is able to contain the adhesive 25g therein for preventing the adhesive 25g from overflowing to other parts of the substrate 10g.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An LED assembly and a power supply circuit thereof for supplying current from a power source to the LED assembly, comprising:
    a plurality of LEDs, a groove being formed on a top face of one of the pair of electrode leads, a tab projecting outwardly from a distal end of the other one of the pair of electrode leads, the plurality of LEDs being so connected together that the groove of each LED fittingly accommodating the tab of an adjacent LED therein;
    an AC circuit for connecting with the power source
    a DC circuit connected to the AC circuit;
    a driving circuit connected between the LEDs and the DC circuit; and
    a snubber circuit connected to the driving circuit, wherein the current provided by the power source is received by the AC circuit, and is then converted to a DC by the DC circuit, and wherein after passing through the snubber circuit, the DC is provided to the LEDs, wherein the snubber circuit flattens a curve of a voltage value of the DC in respect to time initially supplied to the LEDs, thereby to protect the LEDs from a damage caused by a sharp rise of the voltage value of the DC initially supplied to the LEDs.

2. The LED assembly and a power supply circuit thereof as claimed in claim 1, wherein the snubber circuit is connected between the driving circuit and the DC circuit.

3. The LED assembly and a power supply circuit thereof as claimed in claim 1, wherein the snubber circuit is connected between the driving circuit and the plurality of LEDs.

4. The LED assembly and a power supply circuit thereof as claimed in claim 1, comprising a substrate mounted under the plurality of LEDs, the substrate being dielectric from the plurality of LEDs.

5. The LED assembly and a power supply circuit thereof as claimed in claim 4, wherein the pair of electrode leads of the each of the plurality of LEDs hover above the substrate, the DC being input into the plurality of LEDs via the pairs of electrode leads.

6. The LED assembly and a power supply circuit thereof as claimed in claim 5, wherein the pair of electrode leads of the each of the plurality of LEDs are entirely parallel to the substrate.

7. The LED assembly and a power supply circuit thereof as claimed in claim 5, wherein the each of the plurality of LEDs comprises a base supporting the pair of electrode leads therein, the base of the each of the plurality of LEDs being in physical and thermal contact with the substrate.

8. The LED assembly and a power supply circuit thereof as claimed in claim 7, wherein the base of the each of the plurality of LEDs has a hexagonal configuration, an LED die being mounted on a center of the base.

9. The LED assembly and a power supply circuit thereof as claimed in claim 8, wherein the base of the each of the plurality of LEDs forms a hexagonal ring-shaped step around the LED die mounted thereon, the pair of electrode leads being inserted through the step.

10. The LED assembly and a power supply circuit thereof as claimed in claim 1, wherein the plurality of LEDs abuts side-by-side against each other.

11. The LED assembly and a power supply circuit thereof as claimed in claim 1, wherein each of the LEDs further comprises a base, and a leg extending radially and outwardly from the base, the base forming a cutout for receiving the leg of an adjacent LED therein.

12. The LED assembly and a power supply circuit thereof as claimed in claim 11, wherein the leg is spaced from the pair of electrode leads.

13. An LED device, comprising:
    an LED assembly comprising a plurality of first type of LEDs and a plurality of second type of LEDs, each of the first type of LEDs comprising a pair of first electrode leads, each of the pair of first electrode leads forming a trough, each of the second type of LEDs comprising a pair of second electrode leads, each of the pair of second electrode leads forming a tab, the two types of LEDs being so electrically connected together that the troughs of each of the first type of LEDs fittingly respectively accommodating the tabs of neighboring two of the second type of LEDs therein; and
    a power supply circuit adapted for connecting the LED assembly to a power source, wherein the power supply circuit comprises a snubber part to lower a varied gradient of a voltage value of a current which is desired to be input into the LED assembly from the power source.

14. The LED device as claimed in claim 13, wherein the power supply circuit further comprises an AC part adapted for receiving an AC from the power source, a DC part connected to the AC part for converting the AC to a DC, and a driving part connected to the snubber part.

15. The LED device as claimed in claim 14, wherein the snubber part is connected to the LED assembly via the driving part, the snubber part being connected with the DC part.

16. The LED device as claimed in claim 14, wherein the driving part is connected to the LED assembly via the snubber part, the driving part being connected with the DC part.

17. The LED device as claimed in claim 13, wherein the LED assembly further comprises a substrate mounted below the first and second types of LEDs for deriving heat from the first and second types of LEDs.

18. The LED device as claimed in claim 17, wherein the substrate is electrically insulating from the first and second types of LEDs.

* * * * *